INVENTORS
DUDLEY E. CORNELL III
ROBERT A. O'CONNELL
BY
ATTY.

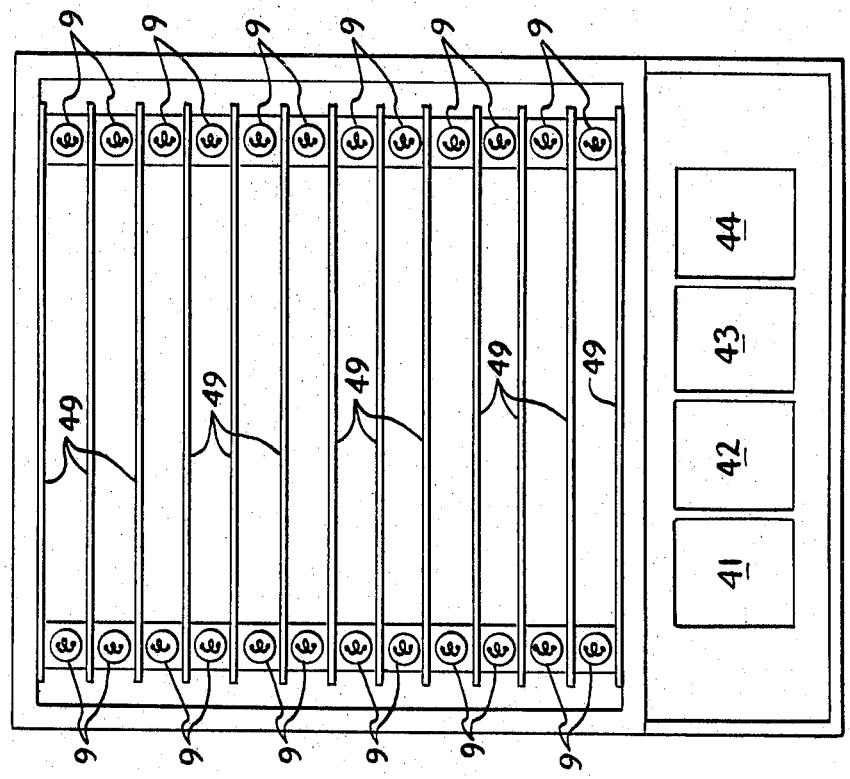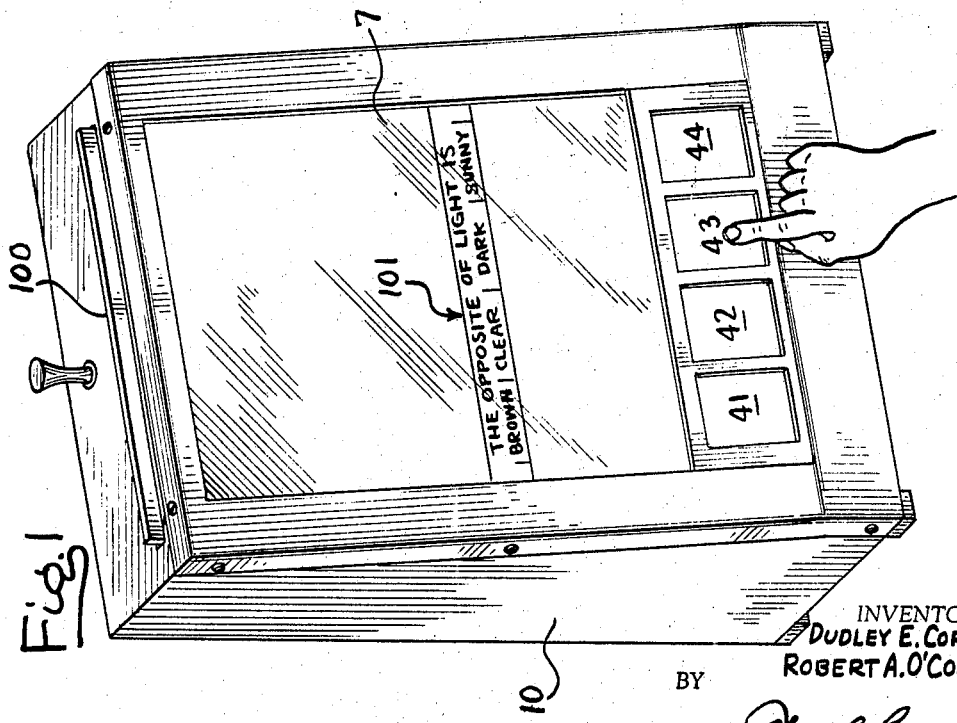

Nov. 11, 1969  D. E. CORNELL III, ETAL  3,477,142
MULTIPLE CHOICE TEACHING DEVICE
Filed July 17, 1967  3 Sheets-Sheet 3
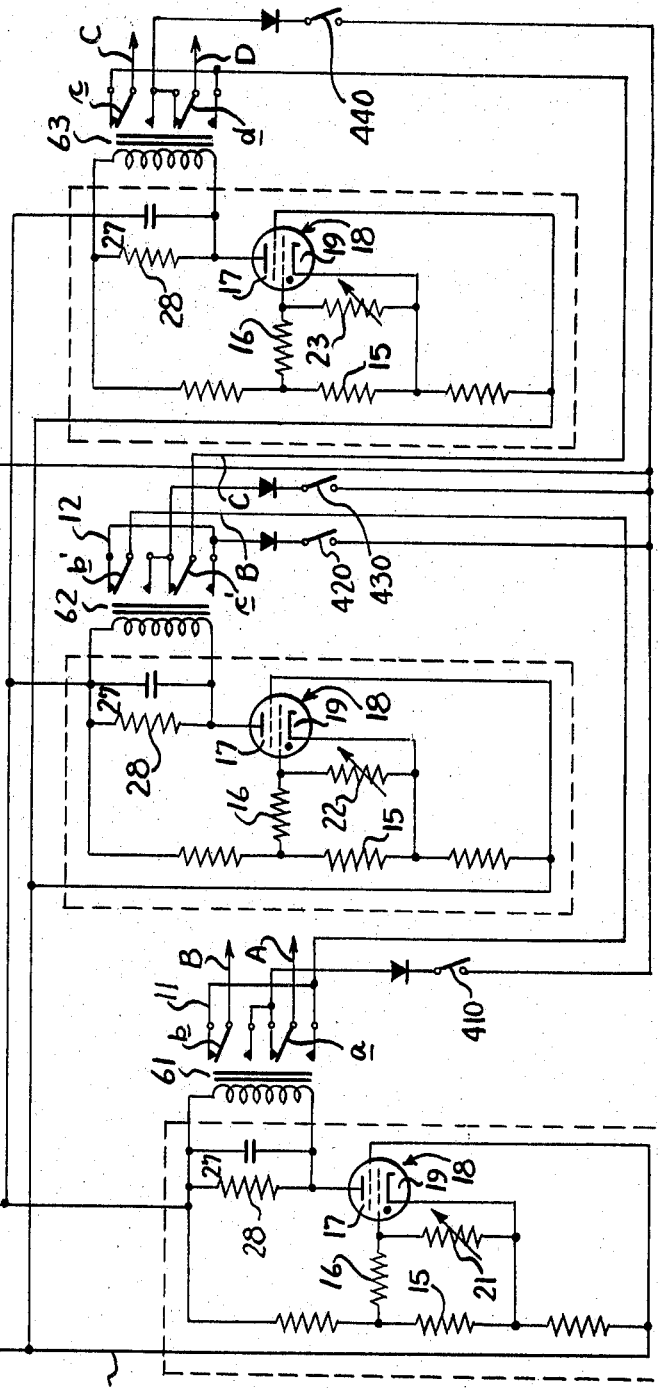
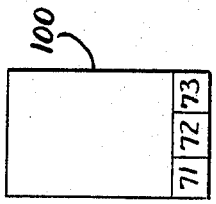
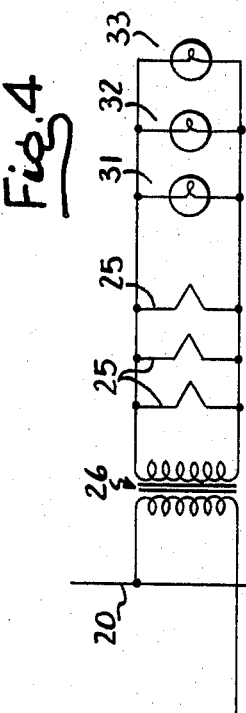
INVENTORS
DUDLEY E. CORNELL III
BY ROBERT A. O'CONNELL
ATTY.

United States Patent Office 3,477,142
Patented Nov. 11, 1969

3,477,142
MULTIPLE CHOICE TEACHING DEVICE
Dudley E. Cornell III, and Robert A. O'Connell, Albuquerque, N. Mex., assignors to Teaching Machines, Inc., Albuquerque, N. Mex., a corporation of New Mexico
Filed July 17, 1967, Ser. No. 662,244
Int. Cl. G09b 7/06
U.S. Cl. 35—9      2 Claims

ABSTRACT OF THE DISCLOSURE

A teaching machine comprising a frame for holding a sheet of question material having a series of questions each with at least four choices given as anwers, means for indicating which question the machine is set for, and depression means corresponding to the choices of answers. One of the depressions means, corresponding to the correct answer, is connected to a "correct answer line" to move the machine setting to the next question when this means is depressed. The other depression means are connected to an 'incorrect answer line" to provide a time delay penalty when these means are depressed. Means are provided for recoding the "correct" and "incorrect" depression means for each new set of questions put in the machine. A student using the machine suffers a time delay penalty each time he gives a wrong answer, but advances on to the next question each time he gives a correct answer.

---

The present invention is directed to teaching machines. More particularly, the invention relates to a multiple choice device in which a question and multiple proposed answers are displayed, only one of said answers being correct, said device having a plurality of push buttons or manually operated selectors, each corresponding to one of the multiple proposed answers, and means for indicating whether the selection was correct.

The principal advantage of teaching machines is that the student can proceed at his individual rate and at any time with the assurance that he is progressing correctly, even in the absence of the instructor. While the teaching principles of teaching devices may be applied to personal instruction and, in fact, may be used by the individual for self-instruction without using a device, the teaching machine provides an advantage in that the user employs his knowledge in answering questions and has a check of the correctness of the answers. When a student, in ordinary self-instruction, merely reads a text or question and assumes that he understands the material, he may well have a misconception which carries through subsequent reading thereby undermining the whole course of study. Furthermore, if the student tests his knowledge but has the correct answers available and identified, there may be a temptation to use the answers to solve the problems.

Multiple choice teaching machines have been developed in the prior art which employ the technique of presenting a series of questions and several answers to each, only one of which is correct. Although the correct answer is given among others in the prior multiple choice machines, there is no prior requirement to specifically identify and set forth the correct answer elsewhere because one can rely on some indication of light, sound or movement to show that the correct answer was selected. In other prior teaching devices, the correct answer must be eventually revealed specifically for the individual to check his answers, to which correct answer the individual might have access before making his propsed response. The shortcomings of such prior devices are overcome by the instant disclosure.

Prior art multiple choice devices often are not entirely satisfactory because a correct response will be recorded merely by trying each of the possible alternatives; thus, the user may eventually strike the correct answer without knowing the subject matter. Also, in many cases, the coding system of prior multiple choice devices is such that the student can readily learn the pattern of correct answer selection without reference to the question and answer concerned. Coding as used in the frame of reference with respect to prior art devices refers to indicia on the question sheet which operates through a transducing unit on the machine and set the machine to follow a set pattern of correct and incorrect answers.

A complex electromechanical system can be conceived, and some have been made, to provide all the assurances required of non-cheating multiple choice machines. However, the very complexity of such machines, having increased size and cost, defeats the advantage of a teaching machine that permits the student to progress at his own rate at any convenient time and at any location. Furthermore, such complex machines involve equally complex preparation of the instruction material.

It is, accordingly, an object of the present invention to provide a multiple choice device with a sufficiently involved coding that the answers cannot be easily predicted from repeated use of the machine.

It is another object of the invention to provide a multiple choice device in which the instruction material may be prepared with ordinary office machines, particularly a typewriter.

It is an additional object of the invention to provide a multiple choice device in which a penalty of time delay is given for an incorrect selection to minimize random correct selection by the student.

It is a further object of the invention to provide a multiple choice device in which only the question to be answered is presented for student consideration, thus permitting the incorporation of the correct answer in subsequent questions and also avoiding distraction of the individual being instructed.

A still further object of the invention is to provide a multiple choice device sufficiently light and compact to be carried, and inexpensive enough that it may be made available for individual students.

Other and further objects of the invention will become apparent from the specifications and drawings forming a part of this application. The objects of this invention are attained by a novel combination of elements which are given in the description of a preferred embodiment hereinafter provided, reference being made to the accompanying drawings forming part of this specification.

In general, the multiple choice teaching device of this invention has a sheet containing a series of questions with multiple proposed answers, only one of which is correct, supported in a display case so arranged that the questions to be answered are sequentially indicated by illumination, a pointer, or the like. It also has a keyboard or equivalent selecting means with a number of keys corresponding to the number of proposed answers. Only depression of the key corresponding to the correct answer through appropriate electrical circuitry will operate a multi-arm, multicontact stepping switch that will advance the question indicating means to the next question to be answered and, then at the same time, will provide the connection between that particular key which responds to the correct answer to the next question and the circuit means which operates the stepping switch. Whereas, depression of all other, or "wrong," keys energizes another or penalty circuit which prevents the operation of the stepping switch and renders the indicating device, as well as the entire operation, inactive for a fixed time. In other words, if one of the "wrong" selector keys is depressed, the pointer is withdrawn or the illumination of the question is extinguished so that the machine may not be operated for some seconds, thus penalizing the student for the incorrect answer. With each new question presented, as a result of punching or selecting a "correct" answer selector or key and, therefore, operating the advancing circuit, the stepping switch provides different connections between the selecting keys and the question advancing and penalty circuits.

In addition, there is also provided on each question sheet a means for changing lines connecting the selection keys to the various arms of the stepping switch, by reason of which the pattern of the sequence of correct answers is varied. This is accomplished through a series of reversing switches across the lines from a pair of selection keys. The reversing switches may be actuated in a plurality of fashions, but are advantageously set in a position in accordance with a binary code, given on the question sheet, that activates circuits for operation of the reversing switches.

On the drawings:

FIGURE 1 is an isometric view of an apparatus embodying the instant invention;

FIGURE 2 is a partial sectional view of the apparatus shown in FIGURE 1 and illustrating the illuminating elements and spacers;

FIGURE 4 is a schematic electrical diagram of one form of code controlled circuit altering mechanism; and FIGURE 5 is a question sheet.

Figure 3:
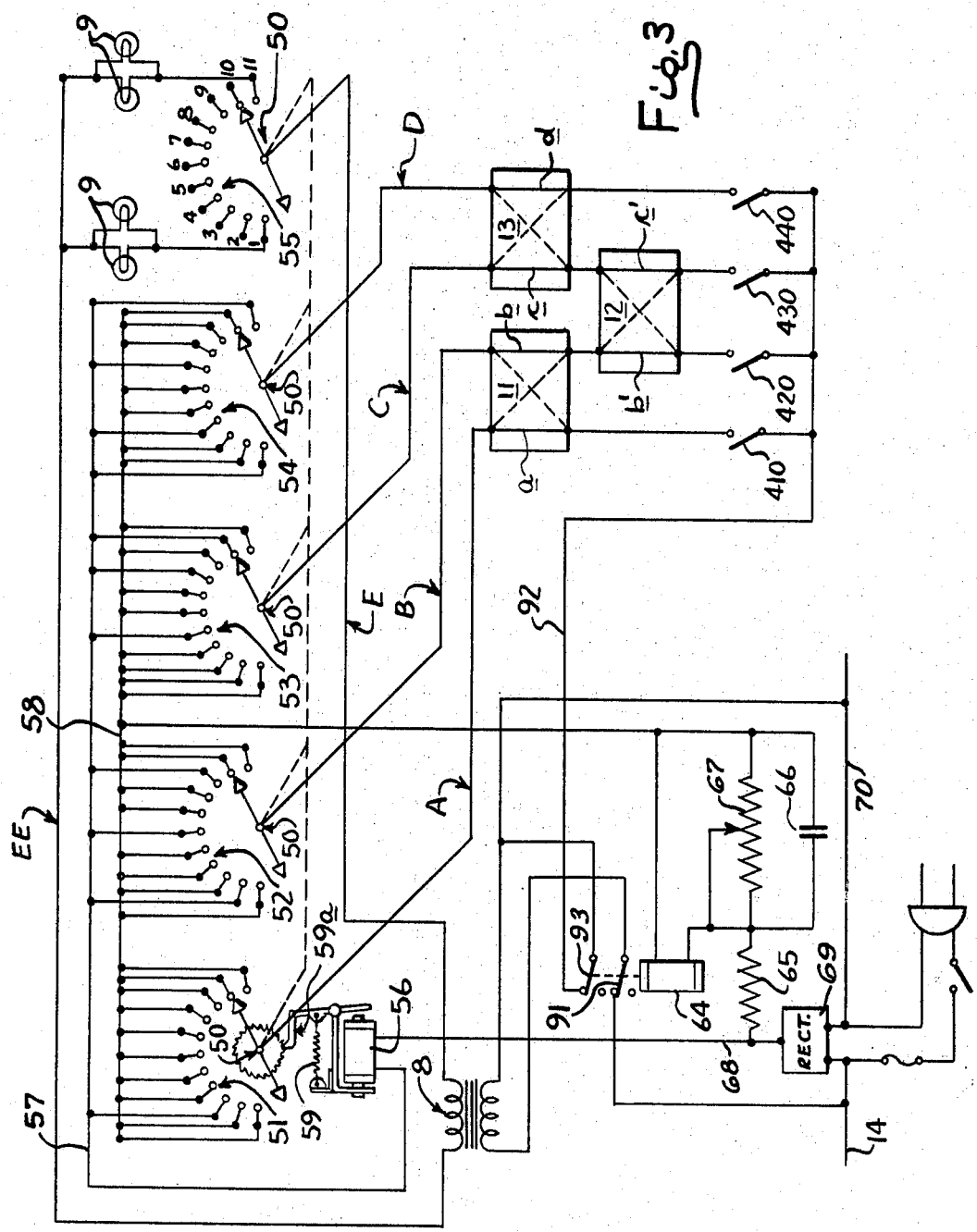
FIGURE 3 is a schematic electrical diagram of the basic circuit of the present invention.

Referring to the numbered elements shown in the several figures wherein the same number on the different figures refers to the same element, a preferred embodiment of the invention comprises a case 10 for displaying a sheet 100 of programmed questions and multiple answers, with lights 9 illustrated in FIGURES 2 and 3, for sequentially illuminating the question to be answered. Interposed between the individual being instructed and the illuminated question with multiple answers is a sheet 7 preferably fabricated of normally transparent materials, such as clear plastic or glass, which is coated with a thin layer of silver on the outer surface thereof to provide a so-called one-way mirror sheet, so that only the question which is illuminated on the other side of the sheet 7 is visible to the individual being examined or instructed. All other unilluminated questions are preferably non-visible by reason of the reflection of light from the surface of the so-called one-way mirror 7. Dividers or shields 49, between the question sheet 100 and the one-way mirror 7, prevent the illuminating means or lights 9 for one question from lighting questions other than the one intended.

Multiple selection keys or manually depressable buttons 41, 42, 43 and 44 enable the student to select the correct answer among the several indicated. Each key or button 41–44, when depressed, will close a respective switch 410, 420, 430 and 440, illustrated in FIGURES 3 and 4.

A multi-arm multi-point stepping switch 50 is connected by circuit wires, hereinafter described, to the multiple selection switches 410–440, whereby selection of the correct answer for a given question will, through connection of switch 50 into electrical contact with corresponding next-subsequent terminals of terminal plates 51, 52, 53 and 54 and the penalty line 58 and advance line 57, and automatically move the indicating lights 9 to the next question to be answered. Selection of an incorrect answer will energize the penalty circuit and prevent energization of relay 56 and also prevent the advancing of the indicating lights 9 to the next question and engage a timing circuit to provide the time delay penalty, which will be described more fully hereinafter.

To provide a plurality of codes, the instruction or question sheet 100 has coded thereon binary actuating indicia 71, 72 and 73 for setting each of the reversing switches or two position relays 11, 12 and 13 in the circuit between the selecting key operated switches 410–440 and the stepping switch 50 controlling the question indicating lights 9. As illustrated in FIGURE 4, one mechanism for accomplishing this comprises photoelectric cells 21, 22 and 23 and corresponding light sources 31, 32 and 33 arranged so that a white area will reflect light from the light source to the corresponding photocell, thereby activating it and, in turn, controlling the relays 61, 62 and 63 which control switches 11, 12 and 13. A black area does not reflect sufficient light and, therefore, would not activate the corresponding photocell. Where multiple photocells and light sources are used, as in the instant illustration, the different areas or the respective coding indicia 71, 72 and 73 on the page may be coded in black or white for selectively energizing or deenergizing relays 61, 62 and 63. Other variations are within the scope of the invention, including the use of holes or the lack thereof to permit or block the transmission of light between the light source and the photocell. Similarly, sections of the page may be made electrically conductive for the closing of circuits.

In operation, the reversing switches, in essence double-pole double-throw switches 11, 12 and 13, are each normally in one position under the action of any suitable means, such as a spring (not shown). Energization of any relay 61–63 will pull its respective switch 11–13 to its alternate position. In the particular embodiment illustrated, energization of the relays 61–63 depends on the non-activation of the photocells 21–23, as described hereinafter. The energy for activating photocells 21, 22 and 23 comes from lamps or light sources 31, 32 and 33. The lamps 31, 32 and 33 are screened from the photocells and require the interposition of a white or bright surface between them and the photocells to reflect light in order to activate the photocells. The insertion of a sheet of white paper, such as the examination sheet 100, into the apparatus will activate each of the photocells 21, 22 or 23 unless the appropriate code areas 71, 72 or 73 are blacked out.

In the particular arrangement shown in FIGURE 4, which may be assumed to have all three of the code areas 71, 72 and 73 of the question sheet blacked out, and accordingly, relays 61–63 energized, the switches 11, 12 and 13 are arranged so that closing selector switch 410 energizes a circuit line A, closing selector switch 440 energizes a circuit line D, closing selector switch 420 energizes a circuit line B and closing selector switch 430 energizes a circuit line C. In other arrangements of the code responsive switches 11, 12 and 13, switch 410 can be made to energize line B and switch 440 may be made to energize line C, and switches 420 and 430 may be made to energize each of the lines A, B, C or D. However, in any arrangement of of the switches 11, 12 and 13, selector means 410–440 each will be connectable to only one of the lines A, B, C or D depending upon the position of such switches.

The circuit lines A, B, C and D and another circuit line E are connected to terminal plates 51, 52, 53, 54 and 55, respectively, through rotary multiple-pole multiple-point switch 50. Switch 50 is adapted to sequentially contact each of the terminals on the respective plates 51–55.

The circuit line E is connected to a ten-volt secondary of transformer 8. The transformer 8, through circuit line EE, connects to each pair of lamps 9 with each pair of lamps 9 connected to a corresponding terminal on plate 55. Each pair of lamps 9 illuminates one question and multiple choice of answers thereto, 101 on the examination sheet 100.

In terminals of each set (a set being the terminals corresponding to the answers for a given question) on each of the plates 51, 52, 53 and 54, one of the terminals connects to the "advance" line 57 and all the other terminals in the set are connected to the "penalty" line 58. The energization of line 57 through appropriate terminals from plates 51–54 connected to the "advance" line will indicate the correct answer by operably engaging the "advance" circuit, whereas energization of line 58 through any of the other terminals will indicate an incorrect answer and operate the "penalty" circuit, as will be later explained.

As illustrated in FIGURE 3, each of the lines are connected to the first or top points. In the specific wiring arrangement illustrated in solid lines in the drawings, the tenth pair of lights 9 illuminating the tenth question on the sheet are lighted because the primary of transformer 8 is actuated from the A–C line 93 through the double-pole single-throw switch 91. If the wrong key, or more than one of selected keys 41, 42, 43 and 44, is depressed to indicate the answer, the apparatus will demonstrate that the correct answer has not been selected, assuming the tenth question or tenth position, as illustrated in FIGURE 3.

In particular, upon depression of one or more of the wrong keys 41, 42, 43 or 44, the corresponding one of the switches 410, 420, 430 or 440 will be closed to connect a line 92 to one of the lines A, B, C or D and to thereby connect the line 92 to line 58 which is connected to one terminal of a relay 64. The other terminal of the relay 64 is connected to one terminal of a resistor 65, with a capacitor 66 and an adjustable resistor 67 being connected in parallel with the relay 64. The other terminal of the resistor 65 is connected to a line 68 which is connected to one DC output terminal of a rectifier 69 having a second DC output terminal, and also an AC input terminal, connected to a line 70. Line 70, in the illustrated condition of the circuit, is connected through a normally closed contact 93 of the relay 64 to the line 92. Accordingly, upon depression of a wrong key, line 70, which is connected to one DC output terminal of the rectifier 69 is connected through contact 93 to line 92 which as described above is connected to the line 58 when a wrong key is depressed. Line 58 is connected through the relay 64 and the resistor 65 to the other DC output terminal of the rectifier 60 so that the relay 64 is energized.

Upon energization of relay 64, a contact 91 is opened to disconnect an AC line 14 from one terminal of the primary of transformer 8 and to thereby deenergize the lamps 9. The contact 93 is also opened by energization of relay 64 to disconnect line 70 from line 92.

When the relay 64 is energized, the capacitor 66 is charged, to maintain the relay 64 energized for a certain time interval, which may be adjusted within limits by adjustment of the resistor 67. At the end of that time interval, the relay 64 becomes deenergized to again energize the primary of transformer 8 and to energize the lamps 9.

If, on the other hand, only the "right" answer key 43 is depressed, a DC circuit is completed from line 70 through relay contact 93, line 92, selector switch 43, switches 12 and 13 to line C, and a rotary switch assembly 50, is in turn, connected through the tenth terminal in terminal plate series 53 to line 57. Line 57, in turn, is connected through the stepper relay 56 to the DC positive terminal. Stepper relay segment 56 activates a spring operated dog 59a which is not released until the circuit on the stepper relay segment 56 is broken by the opening of selector switch 43. When that occurs, the spring mechanism 59 causes dog 59a to move each of the rotary arms of the rotary switch 50 to the next set or series of terminals on plates 51–55 so that the circuit lines E and EE are now connected to the eleventh pair of illuminating means in the series 9 to illuminate the eleventh question.

Line D will then be connected through the eleventh point to line 57 and lines A, B and C are connected to the line 58. In such position, with the eleventh question illuminated, it will be necessary to depress selector key 44, for the solid line setting of the code responsive reversing switches 11–13 in FIGURE 3, in order to show the correct answer and to move the rotary switch 50 to the first set or series of terminals on plates 51–55 for illumination of the first question.

If, at the same time selector key 43 ("right" key) is depressed, one or more of the other selector switches 41, 42 and 44 is simultaneously depressed, the rotary multi-point stepping switch 50 will not operate because the circuit line to switch 43 is broken by the opening of contact 93 to line 92 through the activation of relay 64. In other words, the stepper switch 50 will not operate when an incorrect answer is selected, even though the key for a correct answer has been simultaneously depressed.

The terminals in the plates 51–55 are arranged around the central axis of the rotary switch 50 so that, when the last terminals of the series shown are reached by the switch 50, advancement will cause the opposite end of the switch to engage the first terminals in the plates 51–55 to light the first question.

Referring to FIGURE 4 which shows one suitable mechanism for operating relays 61, 62 and 63 and, in turn, reversing switches 11, 12 and 13, references will be particularly made to one of the relay systems which is described. However, each relay operating mechanism is similar to the others which bear common reference numerals. Wtih the understanding that photocells 21, 22 and 23 and lights 31, 32 and 33 are respectively corresponsive and, in turn, reversing switches 11, 12 and 13 and their respective relays 61, 62 and 63 respectively correspond to photocells 21, 22 and 23, the description proceeds: When light from source 31 is reflected from area 71 (areas 72 and 73 corresponding respectively to sources 32 and 33), current from AC line 14 is fed to control grid 17 of thyratron 18 through resistors 15 and 16 which are in parallel with photocell 21. Since photocell 21 has light reflected onto it, the resistance of the photocell is reduced to the point that control grid 17 becomes near enough to the same potential as the cathode 19 to cause the thyratron 18 to cut off. With no conduction through thyratron 18, no current is available to relay 61 and it is deenergized to cause reversing switch 11 to assume the dotted line position illustrated in FIGURE 3.

Having thus described a preferred embodiment of the invention, description of the operation thereof follows: Have reference to FIGURE 3, namely the switching segments a, b, b', c, c' and d of reversing switches 11, 12 and 13. Said switching segments are held in the solid line position because of the energization of the relays 61, 62 and 63 against the action of springs (not shown) which tend to pull them to the dotted line position. In the solid line position of switching segments a, b, b', c, c' and d, the photoelectric cells 21, 22 and 23 are receiving no light from the respective sources 31, 32 and 33. This is by reason of the fact that the code areas 71, 72 and 73 are all blacked out. Accordingly, if one were to press button or key 41, to close switch 410, the circuit in the line A would be energized; if one were to depress key 42 and close switch 420, the circuit in the line B would be energized; if one were to depress key 43 to close switch 430, the circuit in the line C would be energized; and if one were to depress key or button 44 to close switch 440, the circuit in the line D would be energized.

By reversing the switching segments a and b in the reversing switch 11 so that the switching segments a and b assume the dotted line position shown in FIGURE 3, depressing key 41 would energize circuit line B and depressing key or button 42 would energize circuit line A. Similarly, if the switching segments c and d were reversed and the key or selector 43 depressed, circuit line D would be energized, and if the selector key 44 were depressed, circuit line C would be energized.

If we assume that switching segments a, b, c and d are not reversed and are left in the solid line position shown in FIGURE 3, and only the switching segments b' and c' are reversed to the dotted line position illustrated in FIGURE 3, then depression of the key or selector 42 would energize circuit line C and depression of the selector or key 43 would energize circuit line B.

Assume further now that, in addition to reversing the switching segments b' and c' to the positions shown in dotted lines in FIGURE 3, the a and b segments of the reversing switch 11 are reversed and also the c and d segments of the reversing switch 13 are reversed, then depression of the key or selector 42 would energize the circuit line D and depression of the key or selector 43 would energize the circuit line A.

While all of the switching combinations have not been described, the remainder of the combinations will be readily apparent.

The manner in which the switching segments a, b, c, d, b' and c' are made to switch back and forth are dependent upon the light and dark areas positioned in the areas identified as 71, 72 and 73 on the question sheet 100. That is to say, in a binary system, eight possible arrangements of light and dark in areas 71, 72 and 73 are available for the purpose of effecting the arrangement of the switching segments in the reversing relays 11, 12 and 13.

For the purpose of further illustration, assume two different positions of the switches 11, 12 and 13, namely that shown in the solid line in FIGURE 3 and the other shown in the dotted line in FIGURE 3. In the position shown in the solid line in FIGURE 3, the switching segments of the respective reversing switches 11, 12 and 13 are all held in their respective positions by reason of the energization of the relays 61, 62 and 63, respectively. That is to say, no light is reflected upon the corresponding photoelectric cells 21, 22 and 23. For the tenth question (which is the one illustrated in the drawings), terminal plate 53 is the one that is connected to the advance line 57. Inasmuch as termnial plate 53 is connected to the C circuit line, in order to get a correct answer it is necessary to depress selector 43 to close switch 430. When the selector 43 is depressed, the right answer is indicated in the following manner: Switch 430 closes. Relay 56 will be activated to energize dog 59a to urge the ratchet of the multi-point switch 50 to turn the switch to the eleventh position. When the switch has reached the eleventh position, the corresponding lights 9, because of the circuit lines E and EE, will light up the eleventh question.

On plate 55 I have numbered positions from 1 to 11 corresponding to the eleven questions on the sheet 100. It is appreciated that two pair of lights are shown namely, those for the first position or first question, and those for the eleventh position or eleventh question; the others have been omitted from the drawings.

If any key or selector 41, 42 or 44, or all of them, are depressed, the penalty circuit will be energized, and the lights will not advance to illuminate the next question, as has heretofore been described.

Now then, assume that all of the switching segments in the reversing switches 11, 12 and 13 have been reversed to the dotted line position shown in FIGURE 3, then such reversal, of course, would be caused by reason of the fact that the code areas 71, 72 and 73 would all be white. Accordingly, light from the lamps 31, 32 and 33 would be reflected on the respective relays 61, 62 and 63, in the manner heretofore described. Consequently, the switching segments would assume their normal position, namely the dotted line position shown in FIGURE 3.

Assume again the tenth question (being the setting of switch 50 illustrated in the drawings). If one were to depress the selector 43, he would energize the A line. In order to get the correct answer and energize the C line, it would be necessary to depress the selector 44 and close the switch 440.

From the foregoing, it is apparent how the coding can be used to variously alter the positions of the switching segments in the reversing switches 11, 12 and 13 so that it would be exceedingly difficult for a student to memorize a pattern of answers.

As many changes or substitutions could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

We claim as our invention:

1. In a teaching device for operation with multiple choice indicia means bearing a series of questions with at least four possible answers to each question only one of which is correct and also bearing at least three code elements, sensing means for sensing said elements, a correct answer line, an incorrect answer line, first, second, third and fourth control lines, stepping switch means having positions respectively corresponding to said questions and operative in each position to connect one of said control lines to said correct answer line and the remaining of said control lines to said incorrect answer line, manually operable means having first, second, third and fourth terminals and an input terminal selectively connectable to said first, second, third and fourth terminals, a first reversing switch having a pair of input terminals connected to said second and third terminals and having a pair of output terminals, a second reversing switch having one input terminal connected to said first terminal, another input terminal connected to one of said output terminals of said first reversing switch and having a pair of output terminals connected to said first and second control lines, a third reversing switch having one input terminal connected to the other output terminal of said first reversing switch, another input terminal connected to said fourth terminal and a pair of output terminals connected to said third and fourth control lines, and means respectively controlling said first, second and third reversing switches from said code sensing means.

2. In a teaching device for operation with multiple choice indicia means bearing a series of N questions with n possible answers to each question only one of which is correct, a correct answer line, an incorrect answer line, manually operable means having n output terminals and an input terminal selectively connectable to said n output terminals, means including stepping switch means for sequentially connecting said n output terminals to said correct and incorrect answer lines, one of said n output terminals being connected to said correct answer line and the remaining said n output terminals being connected to said incorrect answer line and each position of said stepping switch means, means operable in each position of said stepping switch means for illuminating a corresponding one of said questions and the possible answers thereto, means operable in response to connection of said input terminal to said incorrect answer line to disable said illuminating means for a certain time delay period and for thereafter enabling said illuminating means, means for disabling said stepping switch means during said time delay period, and means responsive to connection of said input terminal to said correct answer line for effecting operation of said stepping switch means to a new position.

References Cited

UNITED STATES PATENTS 3,100,352   8/1963   Boissevain _____ 35—9

EUGENE R. CAPOZIO, Primary Examiner

W. H. GRIEB, Assistant Examiner